(12) United States Patent
Ohta (10) Patent No.: US 7,775,517 B2
(45) Date of Patent: Aug. 17, 2010

(54) CARD COLLECTION MECHANISM AND CARD ISSUING DEVICE

(75) Inventor: Keiji Ohta, Nagano (JP)

(73) Assignee: Nidec Sankyo Corporation (JP)

( * ) Notice: Subject to any disclaimer, the term of this patent is extended or adjusted under 35 U.S.C. 154(b) by 81 days.

(21) Appl. No.: 11/965,876

(22) Filed: Dec. 28, 2007

(65) Prior Publication Data
US 2009/0020943 A1 Jan. 22, 2009

(30) Foreign Application Priority Data
Dec. 28, 2006 (JP) ............................. 2006-354199

(51) Int. Cl.
*B65H 31/26* (2006.01)
(52) U.S. Cl. .................... 271/220; 271/4.01; 271/184; 271/188; 271/902
(58) Field of Classification Search ................ 271/4.07, 271/4.05, 4.01, 184, 225, 188, 902, 220, 271/207
See application file for complete search history.

(56) References Cited

FOREIGN PATENT DOCUMENTS

| JP | 5-159110 | | 6/1993 |
|---|---|---|---|
| JP | 05159110 A | * | 6/1993 |
| JP | 2001-243426 | | 9/2001 |

* cited by examiner

*Primary Examiner*—Patrick H. Mackey
*Assistant Examiner*—Gerald W McClain
(74) *Attorney, Agent, or Firm*—Cantor Colburn LLP (57) ABSTRACT

A card collection mechanism may include a card collection box for collecting a card, a feeding roller for carrying the card from a feeding passage to the card collection box, and a guide part for guiding the card to the card collection box. The guide part guides the card while the guide part causes the card to be resiliently bent in a direction where an urging force directed to a surface of the feeding roller is applied to the card when the card is fed to the card collection box, and the feeding roller carries the card to a state in which the card is capable of being collected in the card collection box. The card collection mechanism may be used in a card issuing device having a card issuing part.

11 Claims, 4 Drawing Sheets

CARD COLLECTION MECHANISM AND CARD ISSUING DEVICE

CROSS REFERENCE TO RELATED APPLICATION

The present invention claims priority under 35 U.S.C. §119 to Japanese Application No. 2006-354199 filed Dec. 28, 2006, which is incorporated herein by reference.

FIELD OF THE INVENTION

An embodiment of the present invention may relate to a card collection mechanism for collecting a card and to a card issuing device which is provided with the card collection mechanism.

BACKGROUND OF THE INVENTION

Conventionally, a card reader has been known which includes a card reader part for reproducing information from a card such as a magnetic card or for recording information into the card, a card hopper in which cards before they are used are stored, and a reject box in which a card after it has been used is collected, and which provides a card issuing function and a card collection function (see, for example, Japanese Patent Laid-Open No. Hei 5-159110 and Japanese Patent Laid-Open No. 2001-243426).

In the card reader as described in Japanese Patent Laid-Open No. Hei 5-159110, a card hopper and a reject box are disposed so as to superpose on each other in a vertical direction from the upper side in this order. Specifically, the card hopper is disposed on an upper side of a straight-shaped feeding passage where a card is carried and a reject box is disposed on a lower side of the feeding passage. Further, the card reader is provided with a card feeding mechanism between the card hopper, the reject box and the card reader part for issuing a card to the card reader part and for collecting a card from the card reader part.

In the feeding mechanism described in Japanese Patent Laid-Open No. Hei 5-159110, when a card is to be collected in the reject box, the card becomes to be temporarily in a resiliently bent state because the card being carried on the straight-shaped feeding passage is guided to the reject box which is disposed on the lower side of the feeding passage. However, in this feeding mechanism, in order to adequately carry and collect a card, take-in rollers are disposed at a position where a rear side portion of the card can be carried in a state that the card which is temporarily bent resiliently is restored to the straight line shape again.

In the card reader described in Japanese Patent Laid-Open No. 2001-243426, the card hopper and the reject box are disposed so as to superpose on each other in a vertical direction from the upper side in this order. Specifically, the card hopper and the reject box are disposed on the upper side of a straight-shaped card feeding passage. Further, this card reader is provided with a flapper and three-gang rollers for issuing a card to the card reader part and for collecting a card from the card reader part between the card hopper, the reject box and the card reader part In the card reader described in Japanese Patent Laid-Open No. 2001-243426, when a card is to be collected in the reject box, a card is resiliently and temporarily bent by the flapper because the card being carried on the straight-shaped feeding passage is guided to the reject box which is disposed on the upper side of the feeding passage. However, in this feeding mechanism, in order to adequately carry and collect a card, the three-gang rollers are disposed at a position where a rear side portion of the card is carried in a state that the card which is resiliently and temporarily bent is restored to the straight shape again.

However, in the card readers described in Japanese Patent Laid-Open No. Hei 5-159110 and Japanese Patent Laid-Open No. 2001-243426, in order to collect a card to the reject box (card collection box), the take-in rollers or the three-gang rollers are disposed at a position where a rear side portion of the card can be carried in a state that the card which is resiliently and temporarily bent is restored to the straight shape again. Therefore, a structure of the card reader which is provided with the card collection box becomes complicated. Further, an overall length of the card reader in a card carrying direction also becomes longer and a card carrying time to the card collection box becomes longer and thus it is difficult that a card collecting time is shortened.

SUMMARY OF THE INVENTION

In view of the problems described above, an embodiment of the present invention may advantageously provide a card collection mechanism which is capable of shortening a card collecting time with a simple structure, and provide a card issuing device which is provided with the card collection mechanism.

Thus, according to an embodiment of the present invention, there may be provided a card collection mechanism including a card collection box for collecting a card, a feeding roller for carrying the card from a feeding passage for card which is formed in a straight line manner to the card collection box, and a guide part for guiding the card to the card collection box. The guide part guides the card while the guide part causes the card to be resiliently bent in a direction where an urging force directed to a surface of the feeding roller is applied to the card when the card is fed to the card collection box, and the feeding roller carries the card to a state in which the card is capable of being collected in the card collection box.

In this specification, the phrase of that "a state in which the card is capable of being collected in the card collection box" means a state that a card can be collected in a card collection box even when an external force is not applied to the card. In other words, the phrase of that "the feeding roller carries the card to a state in which the card is capable of being collected in the card collection box" means that a card can be collected in the card collection box by the feeding roller which carries a card without using another carrying means for card.

In the card collection mechanism in accordance with an embodiment of the present invention, the feeding roller which carries a card in a state where the card is resiliently bent by the guide part carries the card to a state where the card can be collected in the card collection box. Therefore, different from the conventional case, there is not required that another feeding means is provided at a position where a rear side portion of the card is capable of being carried in a state that the card which is temporarily and resiliently bent is restored to the straight line shape again. Therefore, in this embodiment, a structure of a device on which the card collection mechanism is mounted can be simplified. Further, a distance between the feeding roller and the card collection box can be shortened and thus a card collecting time can be shortened.

Further, in the card collection mechanism in this embodiment, the guide part guides the card while the guide part causes the card to be resiliently bent in a direction where an urging force directed to a surface of the feeding roller is applied to the card when the card is carried to the card collection box. Therefore, a carrying force for a card by the feeding roller can be generated securely. As a result, in this embodiment, sure carrying and collection of a card by the feeding roller can be performed.

In accordance with an embodiment of the present invention, the card collection mechanism is provided with a pad roller which face the feeding roller and is urged to the feeding roller, and a first passage where the card passes from the feeding roller to the card collection box. The first passage is structured so that resiliently bending of the card is restored when a rear end of the card carried to the card collection box has passed between the feeding roller and the pad roller.

According to the structure as described above, a possibility is reduced in which a card after having passed between the feeding roller and the pad roller is temporarily stopped by the first passage and thus the card can be surely collected in the card collection box. In other words, when the card after having passed between the feeding roller and the pad roller is in a resiliently bent state, there is a possibility that the card is temporarily engaged with a structure member of the first passage at the time when the card is restored to the original state in a straight line shape. However, according to this structure, the possibility that the card is temporarily engaged with the structure member of the first passage is reduced.

In accordance with an embodiment of the present invention, the feeding roller is structured to be capable of carrying the card both in a first carrying direction where the card is carried from the feeding roller to the card collection box and in a second carrying direction which is a direction opposite to the first carrying direction and where the card is carried from a card processing part performing a prescribed processing to the card to the feeding roller, and the guide part guides the card to the card collection box when the card is carried in the first carrying direction and, when the card is carried in the second carrying direction, the guide part permits carrying of the card from the card processing part to the feeding roller. According to this structure, a passage where a card passes can be branched by using the guide part.

In accordance with an embodiment of the present invention, the card collection mechanism includes a first passage where the card passes from the feeding roller to the card collection box, a second passage where the card passes from the card processing part to the feeding roller, and a plate spring which is provided in the guide part. At least a part of the plate spring is disposed in the first passage and the second passage. Specifically, it may be structured that the plate spring forms the first passage and is disposed to cross the second passage and, when the card is carried in the first carrying direction, the plate spring maintains a crossing state over the second passage and, when the card is carried in the second carrying direction, the second passage is released by using elasticity of the plate spring. In this case, it is preferable that a restriction member is disposed on an opposite side of the card collection box so as to interpose the feeding passage of the card therebetween for maintaining the crossing state of the plate spring over the second passage. According to this structure, a structure of the guide part can be simplified by using the plate spring, The card collection mechanism of the present invention may be used in a card issuing device which is provided with a card issuing part including a card storage part in which cards are to be stored, and a card sending mechanism for sending a stored card which is stored in the card storage part to the feeding roller, and the card issuing part is disposed so as to superpose the card collection box in a vertical direction. In the card issuing unit structured as described above, a structure of the device can be simplified. Further, a card collecting time can be shortened. In addition, a card can be surely carried and collected by the feeding roller.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3(A) and 3(B) are side views showing different states of the card collection mechanism when a card is collected in a card collection box shown in FIG. 1.

DETAILED DESCRIPTION OF THE PREFERRED EMBODIMENTS

An embodiment of the present invention will be described below with reference to the drawings.

Figure 1:
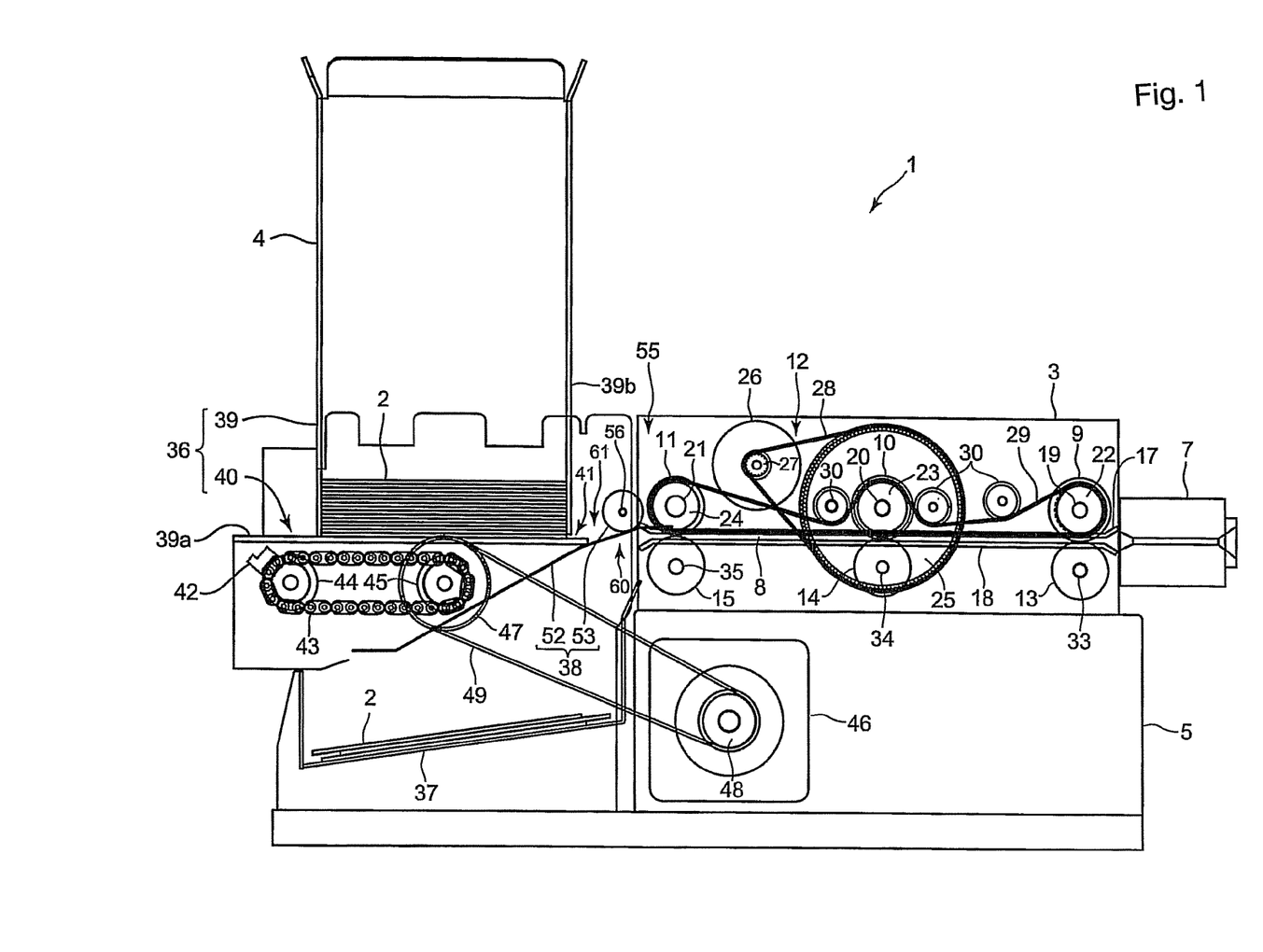
FIG. 1 is a side view showing a schematic structure of a card issuing device in accordance with an embodiment of the present invention.

FIG. 1 is a side view showing a schematic structure of a card issuing device 1 in accordance with an embodiment of the present invention.

The card issuing device 1 in this embodiment is provided with a function for issuing a card 2 which is stored in its inside and a function for collecting a card 2 which has been unneeded, has been used or resulted in error (hereinafter, referred to as "unneeded card 2"). As shown in FIG. 1, the card issuing device 1 includes a card reader 3 for performing reproduction of information recorded on a card 2 and/or recording of information to a card 2, a card issuing and collecting part 4 for issuing a card 2 which is stored in its inside and for collecting a card 2 which has been unneeded, and a mounting part 5 on which the card reader 3 is placed and in which a control circuit board (not shown) of the card issuing device 1 is accommodated. In this embodiment, the card reader 3 placed on the mounting part 5 and the card issuing and collecting part 4 are disposed in this order from the right side in FIG. 1 so as to contact with each other.

In the following description, a front side of paper in FIG. 1 is referred to as "front", a back side of paper in FIG. 1 is referred to as "back", a left side in FIG. 1 "left", a right side in FIG. 1 "right", an upper side in FIG. 1 "upper", and a lower side in FIG. 1 "lower". Further, in the following description, a left side edge of the card 2 in FIG. 1 is referred to as "front edge" and a right side edge is referred to as "rear edge".

The card 2 used with this embodiment is, for example, a rectangular card which is made of vinyl chloride with a thickness of about 0.7-0.8 mm. The card 2 is formed on its surface, for example, with a magnetic stripe in which magnetic information is recorded. Also, an IC chip may be fixed in the card 2. Further, an antenna for communication may be provided within the card 2 and a printing part on which printing is performed by using a thermal method may be formed on the surface of the card 2. In addition, the card 2 may be a PET (poly ethylene terephthalate) card with a thickness of about 0.18-0.36 mm or may be a paper card.

The card reader 3 includes a card inserting and ejecting part 7 which is disposed on the right end portion for inserting and ejecting a card 2, a feeding passage 8 through which the card 2 is carried, three drive rollers 9 through 11 which are disposed in the feeding passage 8, a roller drive mechanism 12 for driving the drive rollers 9 through 11, and pad rollers 13 through 15 which respectively face the drive rollers 9 through 11 and are urged to the drive rollers 9 through 11.

For example, when a card 2 which is to be used is a magnetic card on which a magnetic stripe is formed, the card reader 3 is provided with a magnetic head (not shown). Further, when a card 2 which is to be used is a contact type IC card to which an IC chip is fixed, the card reader 3 is provided with IC contacts (not shown) and, when a card 2 to be used is a non-contact type IC card within which a communication antenna is provided, the card reader 3 is provided with an antenna for communication (not shown). In addition, when a card 2 to be used is formed with a printing part, the card reader 3 is provided with a thermal head for performing printing in a thermal method (not shown).

The feeding passage 8 is horizontally formed in a straight-line shape from the left-side end of the card inserting and ejecting part 7 to the left-side end of the card reader 3. Specifically, the feeding passage 8 is formed in a straight-line shape between a block-shaped upper feeding guide 17 which is disposed on an upper side and a block-shaped lower feeding guide 18 which is disposed on a lower side.

The drive rollers 9 through 11 are disposed on the upper side of the feeding passage 8. Specifically, the drive rollers 9 through 11 are disposed so that lower end portions of the drive rollers 9 through 11 are protruded on a lower side of the upper feeding guide 17. Further, in this embodiment, the drive roller 9 is disposed on the right-side end portion of the feeding passage 8, the drive roller 10 is disposed at a roughly center portion of the feeding passage 8 in a right and left direction, and the drive roller 11 is disposed on the left-side end portion of the feeding passage 8. In this embodiment, the drive roller 11 disposed on the left-side end portion is used as a feeding roller for carrying a card 2 from the feeding passage 8 to a card collection box 37 described later which structures the card issuing and collecting part 4.

The roller drive mechanism 12 includes driven pulleys 22 through 24 which are respectively fixed to respective rotation shafts 19 through 21 of the drive rollers 9 through 11, a large driven pulley 25 which is fixed to a rotation shaft 20 of the drive roller 10 in parallel with the driven pulley 23, a drive motor 26 for driving the drive rollers 9 through 11, and a drive pulley 27 which is fixed to an output shaft of the drive motor 26. Further, the roller drive mechanism 12 includes a timing belt 28 stretched between the drive pulley 27 and the large driven pulley 25, a timing belt 29 stretched over the driven pulleys 22 through 24, and a plurality of tension pulleys 30 for adjusting a tension of the timing belt 29. The rotation shafts 19 through 21 are rotatably supported on a frame (not shown) of the card reader 3.

The drive motor 26 in this embodiment is capable of rotating in both directions. In other words, the drive rollers 9 through 11 are capable of rotating in both directions, i.e., in a clockwise direction and a counterclockwise direction so as to be capable of carrying a card 2 in right and left directions.

The pad rollers 13 through 15 are disposed on a lower side of the feeding passage 8. The pad rollers 13 through 15 are respectively capable of rotating together with rotation shafts 33 through 35. Further, the rotation shafts 33 through 35 are urged toward an upper direction by urging members not shown so that the pad rollers 13 through 15 are respectively pressurized to the drive rollers 9 through 11.

The card issuing and collecting part 4 includes a card issuing part 36 for issuing a card 2 which is previously stored in its inside, a card collection box 37 for collecting a card 2 which is unneeded, and a guide part 38 for guiding a card 2 to the card collection box 37. As shown in FIG. 1, the card issuing part 36 is disposed on the upper side portion of the card issuing and collecting part 4 and the card collection box 37 is disposed on the lower side of the card issuing and collecting part 4. Specifically, the card issuing part 36 is disposed on the upper side of the feeding passage 8 in the vertical direction and the card collection box 37 is disposed on the lower side of the feeding passage 8. Further, the card issuing part 36 and the card collection box 37 are disposed so as to be superposed on each other in the vertical direction.

The card issuing part 36 is provided with a card storage part 39 in which a plurality of cards 2 before issue is stacked and stored in the vertical direction and a card sending-out mechanism 40 for sending a card 2 at the lowest position (the lowest card 2) among a plurality of cards 2 which is stored in the card storage part 39 to the feeding passage 8 (specifically, to the drive roller 11). In this embodiment, the card issuing part 36 is a card processing part in which a card 2 is issued.

The card storage part 39 is formed in a rectangular parallelepiped box shape whose upper face is opened. A bottom face part 39a forming a bottom face of the card storage part 39 is formed with a passage hole (not shown) where a sending pawl 42 described later which structures the card sending-out mechanism 40 is passed. Further, a gate 41 through which a card 2 stored in the card storage part 39 is passed to the feeding roller 11 (to the right side) is formed between a lower end of the right side wall 39b and the bottom face part 39a of the card storage part 39. A gap space in the vertical direction of the gate 41 is set so that one piece of a card 2 can be passed through but two pieces of overlapped cards 2 are unable to pass through.

The card sending-out mechanism 40 includes a sending pawl 42 which is capable of engaging with a front edge of the lowest card 2 stored in the card storage part 39 to send a card 2 to the gate 41 from the card storage part 39 one by one, a chain 43 to which the sending pawl 42 is fixed, a pair of sprockets 44 and 45 over which the chain 43 is stretched, a drive motor 46 for driving the sending pawl 42, a pair of pulleys 47 and 48 for transmitting power of the drive motor 46 to the sprocket 45, and a timing belt 49 which is stretched over the pulleys 47 and 48.

As shown in FIG. 1, the chain 43 and the sprockets 44 and 45 are disposed on the under side of the bottom face part 39a. The pulley 47 is fixed to a rotation shaft of the sprocket 45, which is disposed on the right side, so as to be parallel with the sprocket 45. The pulley 48 is fixed to an output shaft of the drive motor 46. The drive motor 46 is arranged in the mounting part 5.

When the sprockets 44 and 45 are rotated, the sending pawl 42 is reciprocated between the sprockets 44 and 45 together with the chain 43. In this embodiment, under a normal operation, the sprockets 44 and 45 are rotated in the clockwise direction in FIG. 1. Therefore, when the sending pawl 42 is moved from the sprocket 44 to the sprocket 45, the sending pawl 42 is passed on the upper side of the sprockets 44 and 45. At this time, the sending pawl 42 abuts with the front edge of the lowest card 2 and the lowest card 2 is sent to the gate 41. Further, when the sending pawl 42 is moved from the sprocket 45 to the sprocket 44, the sending pawl 5 is passed on the under side of the sprockets 44 and 45.

The card collection box 37 is formed in a rectangular parallelepiped box shape whose upper face is opened. A width in the front and rear direction of the inside of the card collection box 37 is wider than a width in a short side direction of a card 2, and a width in the right and left direction of the inside of the card collection box 37 is wider than a width in a long side direction of the card 2.

The guide part 38 includes a flat spring 52 with which a front edge of a card 2 is abutted which is carried on the feeding passage 8 from the right side to the left side and passed the drive roller 11, and a restriction roller 53 for restricting movement of the flat spring 52.

In this embodiment, the card collection mechanism 55 for collecting a card 2 is structured with the guide part 38, the card collection box 37, the drive roller 11, the pad roller 15, the left side portion of the upper feeding guide 17, the left side portion of the lower feeding guide 18 and the like. A detail structure of the card collection mechanism 55 including a detail structure of the guide part 38 will be described below.

Figure 2:
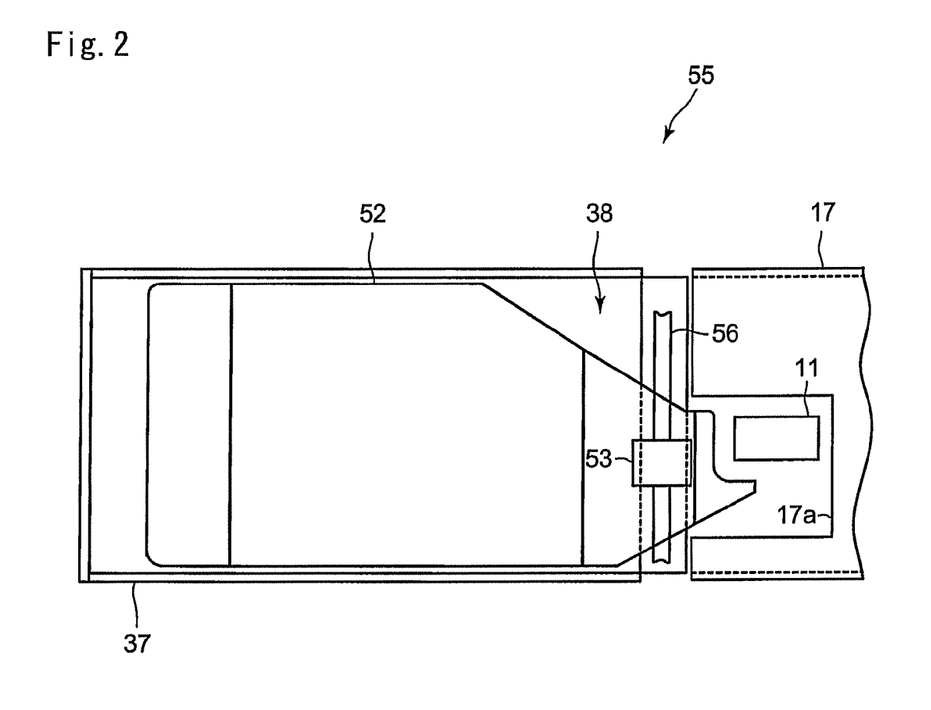
FIG. 2 is a plan view showing a card collection mechanism shown in FIG. 1.
Figure 3A:
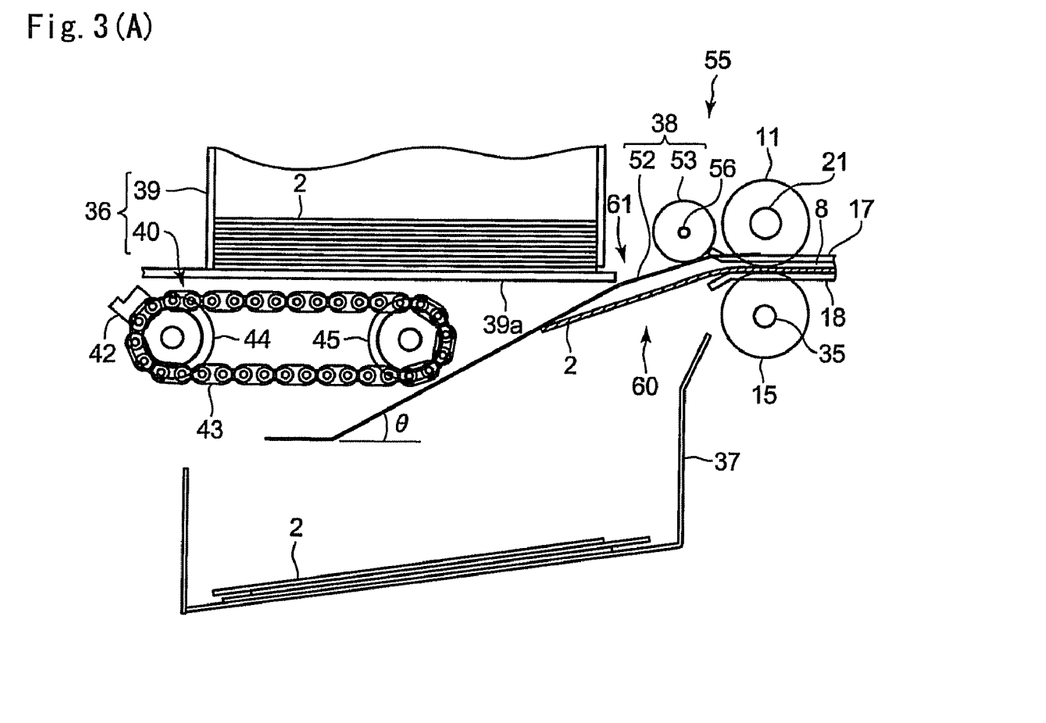
FIG. 3(A) is a side view showing a state where the card is sandwiched between a drive roller and a pad roller and FIG. 3(B) is a side view showing a state when a rear edge of the card has passed through between the drive roller and the pad roller.
Figure 3B:
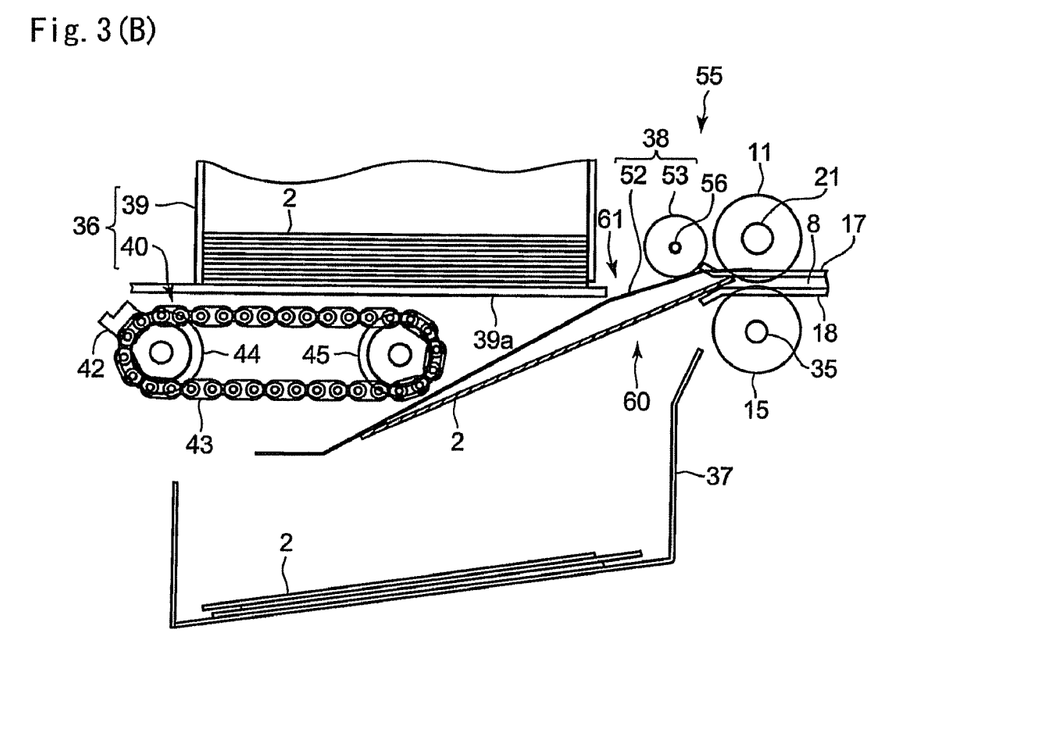
Figure 4:
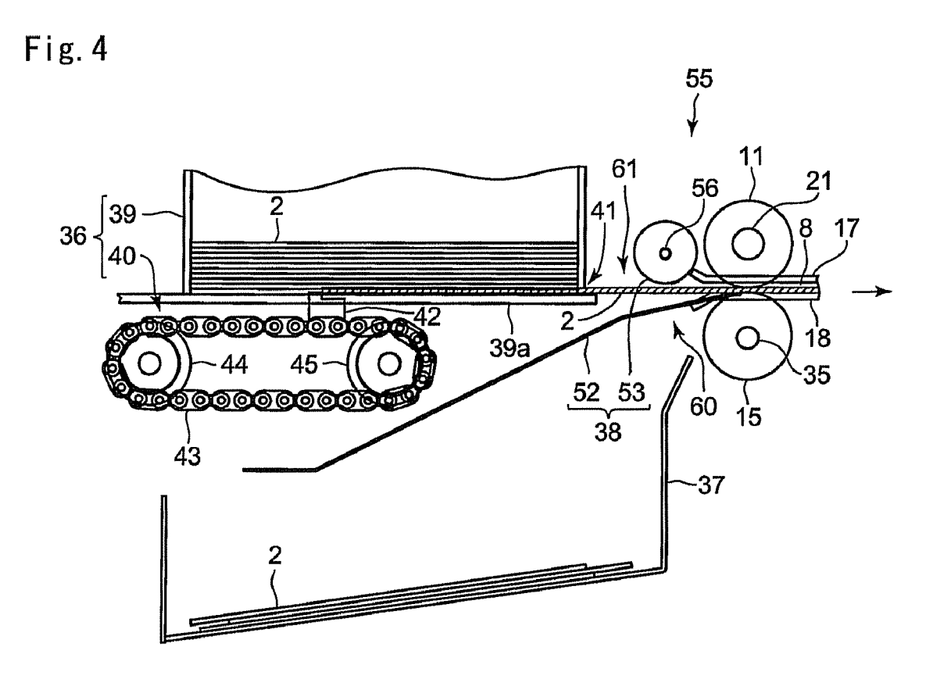
FIG. 4 is a side view showing a state of a card collection mechanism when a card is being issued from a card issuing part shown in FIG. 1.

FIG. 2 is a plan view showing the card collection mechanism 55 shown in FIG. 1. FIGS. 3(A) and 3(B) are side views showing different states of the card collection mechanism 55 when a card 2 is collected in the card collection box 37 shown in FIG. 1. FIG. 3(A) is a side view showing a state where the card 2 is sandwiched between the drive roller 11 and the pad roller 15 and FIG. 3(B) is a side view showing a state when a rear edge of the card 2 has passed through between the drive roller 11 and the pad roller 15. FIG. 4 is a side view showing a state of the card collection mechanism 55 when a card 2 is being issued from the card issuing part 36 shown in FIG. 1.

As described above, the card collection mechanism 55 in this embodiment is structured with the guide part 38, the card collection box 37, the drive roller 11, the pad roller 15, the left side portion of the upper feeding guide 17, the left side portion of the lower feeding guide 18 and the like.

As shown in FIGS. 3(A) and 3(B) and the like, the right-side end of the card collection box 37 and the left ends of the upper feeding guide 17 and the lower feeding guide 18 are disposed at positions so as to be approximately coincided with each other in the right and left direction. In other words, in the right and left direction, the drive roller 11 and the card collection box 37 are disposed so as to be adjacent to each other. More specifically, in the card carrying direction when a card 2 is carried from the right side to the left side, the card collection box 37 is disposed just after the drive roller 11.

As shown in FIG. 2, a rectangular recessed part 17a which is cut toward the right side is formed at the left end portion of the upper feeding guide 17. The drive roller 11 is disposed in the recessed part 17a. Further, a right-side end portion of the flat spring 52 is located so as to cross the recessed part 17a in the vertical direction. The lower feeding guide 18 is formed with a recessed part (not shown) so that the right-side end portion of the flat spring 52 is located so as to cross in the vertical direction.

The flat spring 52 is formed with a plate-like member such as a sheet steel made of stainless steel which is bent at three positions. As shown in FIG. 3 and the like, the flat spring 52 is fixed to a frame (not shown) of the card issuing and collecting part 4 in an upward slant state to the right side. Specifically, a left end side portion of the flat spring 52 is fixed to the frame of the card issuing and collecting part 4 so that the left end side portion of the flat spring 52 is disposed on the under side of the chain 43 and the sprockets 44 and 45 and the right-side end portion of the flat spring 52 is disposed in the vicinity of the drive roller 11. An inclination angle "θ" (see FIG. 3(A)) of the flat spring 52 is set at an angle with which a card 2 can be bent resiliently and the card 2 can be carried by the drive roller 11. In this embodiment, as shown in FIG. 2, a width of the right-side end portion of the flat spring 52 is formed narrower toward the right-side end and, as described above, the right-side end portion of the flat spring 52 is passed through the recessed part 17a in the vertical direction which is formed in the upper feeding guide 17.

The restriction roller 53 is rotatably mounted on a fixed shaft 56 which is fixed to the frame (not shown) of the card issuing and collecting part 4. The restriction roller 53 is disposed at a position where it restricts the upper limit position of the right-side end portion of the flat spring 52. Specifically, the restriction roller 53 is disposed on an upper side of the right end portion of the card collection box 37. Further, the restriction roller 53 is disposed on the left side of the drive roller 11 so as to be adjacent to the drive roller 11.

The flat spring 52 is abutted with the restriction roller 53 so that the flat spring 52 generates an urging force in an upper direction with its left side portion which is fixed to the frame of the card issuing and collecting part 4 as its supporting point. Further, as shown in FIG. 3 and the like, the right-side end portion of the flat spring 52 in the abutted state with the restriction roller 53 is disposed so as to cross obliquely upward to the right side between the left-side end portions of the upper feeding guide 17 and the lower feeding guide 18 and the right-side end of the bottom face part 39a of the card storage part 39.

In the card collection mechanism 55 structured as described above, as shown in FIG. 3, a card 2 which is to be carried so as to pass through the drive roller 11 to the left side is passed under the flat spring 52 and is collected in the card collection box 37. In other words, when a card 2 is to be collected in the card collection box 37, the card 2 is passed under the flat spring 52 from the feeding passage 8 to the card collection box 37.

Specifically, the card 2 passing the drive roller 11 to the left side is carried in a sandwiched state between the drive roller 11 and the pad roller 15. After that, the front edge of the card 2 abuts with an under face of the flat spring 52 whose movement in an upper direction is restricted by the restriction roller 53. When the front edge of the card 2 is abutted with the flat spring 52, as shown in FIG. 3(A), the card 2 is carried by the drive roller 11 while guided to the obliquely left under side along the flat spring 52. In other words, the card 2 carried by the drive roller 11 is guided to the card collection box 37 while bending resiliently so that the front end side portion of the card 2 is warped on the under side by the flat spring 52. Another way of saying, when the card 2 is to be carried to the card collection box 37, the card 2 is guided to the card collection box 37 while bending resiliently in a direction to cause an urging force to be applied to the surface (under face) of the drive roller 11 by the flat spring 52.

Further, when the rear edge of the card 2 is passed through between the drive roller 11 and the pad roller 15, as shown in FIG. 3(B), the card 2 drops to the card collection box 37 as it is. In other words, the card 2 is directly carried to the card collection box 37 by the drive roller 11 installed in the card reader 3. In other words, the card 2 is carried by the drive roller 11 to the state that the card 2 can be collected with the card collection box 37. Another way of saying, even when the drive roller 11 does not apply an extra external force to the card 2, the card 2 is carried to the state where the card 2 can be collected in the card collection box 37.

In this embodiment, as shown in FIG. 3 (B), the card collection mechanism 55 is structured so that the card 2 is not bent resiliently when the rear edge of the card 2 has been passed through between the drive roller 11 and the pad roller 15. In other words, the respective structures of the card collection mechanism 55 such as the upper feeding guide 17, the lower feeding guide 18 and the restriction roller 53 are formed so as not to cause the card 2 to be bent resiliently by the flat spring 52 and, in addition, the respective structures are disposed at positions so as not to cause the card 2 to be bent resiliently by the flat spring 52 when the rear edge of the card 2 has been passed through between the drive roller 11 and the pad roller 15.

On the other hand, as shown in FIG. 4, a card 2 to be issued from the card issuing part 36 is passed over the upper side of the flat spring 52 and issued to the card reader 3. In other words, when the card 2 is to be issued, the card 2 is passed on the upper side of the flat spring 52. Specifically, first, the rear edge of the card 2 whose front edge is pushed by the sending pawl 42 is abutted with an upper face of the flat spring 52 to cause the flat spring 52 to be bent resiliently on its lower side. After that, the card 2 is passed on the upper side of the flat spring 52 while abutting with the right-side end portion of the flat spring 52. At this time, the right-side end portion of the flat spring 52 passes the recessed part 17a of the upper feeding guide 17 to move to the recessed part (not shown) of the lower feeding guide 18.

As described above, the flat spring 52 operates so as not to carry the card 2 from the card reader 3 to the card issuing part 36 but, when a card 2 is to be issued, the card 2 is permitted from carrying from the card issuing part 36 to the card reader 3.

In this embodiment, a direction directing to the card collection box 37 from the feeding passage 8 is referred to as a first carrying direction of card 2. Further, a direction directing to the feeding passage 8 from the card issuing part 36 is referred to as a second carrying direction of card 2 which is an opposite direction to the first carrying direction. In addition, the under side face of the flat spring 52 where the card 2 is passed to the card collection box 37 from the feeding passage 8 at the time of collection of the card 2 is formed as a first passage 60. Further, the upper side face of the flat spring 52 where the card 2 is passed to the feeding passage 8 from the card issuing part 36 at the time of card issuing is formed as a second passage 61.

As described above, in this embodiment, the drive roller 11 for carrying the card 2 in the resiliently bent state by the flat spring 52 carries the card 2 to the state where the card 2 can be collected in the card collection box 37. Therefore, another feeding means which is required in a conventional case is not required to dispose at a position where a rear end side portion of a card 2 is capable of being carried in a state that the card 2 which has been temporarily and resiliently bent is restored to a straight shape again. Accordingly, in this embodiment, the structure of the card issuing device 1 can be simplified. Further, since a distance between the drive roller 11 and the card collection box 37 can be shortened, a collecting time for a card 2 can be shortened.

Further, in this embodiment, the flat spring 52 guides a card 2 while causing the card 2 to be bent resiliently in a direction where an urging force directing to the surface of the drive roller 11 is applied to the card 2 when the card 2 is carried to the card collection box 37. Therefore, a contact force between the drive roller 11 and the card 2 can be enhanced and thus a carrying force for the card 2 by the drive roller 11 can be generated securely. As a result, the card 2 is securely carried by the drive roller 11 and the card 2 can be securely collected in the card collection box 37.

In this embodiment, the card collection mechanism 55 is structured so that the card 2 is not bent resiliently when the rear edge of a card 2 has passed through between the drive roller 11 and the pad roller 15. In other words, the first passage 60 formed on the under side of the flat spring 52 is structured so that the card 2 is not bent resiliently when the rear edge of the card 2 has passed through between the drive roller 11 and the pad roller 15. Therefore, a possibility is reduced where the card 2 just after having passed through between the drive roller 11 and the pad roller 15 is temporarily stopped or propped against the first feeding passage 60. In other words, when the card 2 just after having passed between the drive roller 11 and the pad roller 15 is in a resiliently bent state, there is a possibility that the card 2 is temporarily stopped or propped by a structuring member of the first feeding passage 60 and the flat spring 52 when the card 2 is to be restored to a straight line shape. However, according to the structure as described in this embodiment, the possibility is remarkably reduced. As a result, the card 2 can be further securely collected in the card collection box 37.

In this embodiment, when a card 2 is carried in the first carrying direction, the flat spring 52 guides the card 2 to the card collection box 37 and prevents the card 2 from being carried to the card issuing part 36. Further, when a card 2 is carried in the second carrying direction, the flat spring 52 permits the card 2 to be carried from the card issuing part 36 to the card reader 3. In other words, the flat spring 52 performs a switching operation of the carrying direction of the card 2. Therefore, a passage for carrying a card 2 can be branched with a simple structure with the use of the flat spring 52.

Although the present invention has been shown and described with reference to specific embodiments, various changes and modifications will be apparent to those skilled in the art from the teachings herein. For example, in the embodiment described above, the guide part 38 for guiding a card 2 to the card collection box 37 is structured by using the flat spring 52, the restriction roller 53 and the like. However, for example, a flapper described in Patent Reference 2 may be used as the guide part for guiding a card 2 to the card collection box 37.

In the embodiment described above, the card issuing part 36 is disposed on the upper side of the card collection box 37. However, for example, the card collection box 37 may be disposed on an upper side and the card issuing part 36 may be disposed on an lower side of the card collection box 37. In this case, for example, in the vertical direction, the card issuing part 36 is disposed on the lower side of the feeding passage 8 and the card collection box 37 is disposed on the upper side of the feeding passage 8. Further, in this case, the drive roller 11 is disposed on the lower side of the feeding passage 8 and the pad roller 15 is disposed on the upper side of the feeding passage 8.

Further, the card collection box 37 and the card issuing part 36 may be disposed so as to superpose on each other in the front and rear direction. In this case, the drive roller 11 and the pad roller 15 are disposed so that they face in the front and rear direction.

In the embodiment described above, the card issuing and collecting part 4 which is provided with the card issuing part 36 and the card collection box 37 is disposed on the left side of the card reader 3. However, the present invention is not limited to this embodiment. For example, instead of the card issuing part 36, a switching part for switching a carrying direction of the card 2, a printer for printing on a surface of the card 2, an image sensor for reading printed characters or the like on a surface of the card 2, or the like may be disposed on the left side of the card reader 3 in a state that the card collection box 37 is combined. In this case, it may be structured that a guide part for guiding the card 2 to the card collection box 37 is structured with a flapper so that the card 2 can be carried to the switching part, a printer or the like from the card reader 3. In this embodiment, the switching part, the printer, the image sensor or the like corresponds to the card processing part which performs a prescribed processing to the card 2.

Further, only the card collection box 37 may be disposed on the right side of the card reader 3. In other words, it may be structured that the card issuing part 36 is not disposed on the upper side of the card collection box 37. Alternatively, only the card collection box 37 may be disposed on the upper side of the feeding passage 8. In this case, the guide part which guides the card 2 to the card collection box 37 may be structured with a fixed guide member formed in a wall face.

In the embodiment, the card issuing device 1 is provided with the card reader 3. However, the present invention is not limited to this embodiment. For example, instead of the card reader 3, the card issuing device may be provided with a switching part for switching a feeding direction of the card 2, a printer for printing on a surface of the card 2, an image sensor for reading printed characters or the like on a surface of the card 2, or a feeding passage for performing only carrying of the card 2. In other words, instead of the card reader 3, even in a device provided with only a feeding roller which corresponds to the drive roller 11 and is disposed adjacent to the card issuing and collecting part 4, similar effects to the above-mentioned embodiment can be obtained.

Further, the card issuing and collecting part 4 may be provided with a feeding roller corresponding to the drive roller 11. In this case, the card issuing and collecting part 4 may be separately used by itself. According to this embodiment, similar effects to the above-mentioned embodiment can be obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card collection mechanism for use with at least one card comprising:
a card collection box for collecting the card;
a feeding roller for carrying the card from a feeding passage to the card collection box,
wherein the feeding passage is formed in a straight line manner; and
a guide part for guiding the card from the feeding passage to the card collection box;
wherein the guide part guides the card while the guide part causes the card to be resiliently bent in a direction where an urging force directed to a surface of the feeding roller is applied to the card when the card is fed to the card collection box;
wherein the feeding roller carries the card to a state in which the card is capable of being collected in the card collection box;
wherein the card collection mechanism further comprises:
a first passage where the card is passed from the feeding roller to the card collection box;
a second passage where the card is passed from the card processing part to the feeding roller; and
a flat spring which is provided in the guide part, at least a part of which is disposed in the first passage and the second passage;
wherein the flat spring forms the first passage and is disposed to cross the second passage;
wherein when the card is carried in the first carrying direction, the flat spring maintains a crossing state over the second passage;
when the card is carried in the second carrying direction, the card abuts the flat spring and resiliently bends the flat spring to open the second passage; and
wherein the card collection mechanism further comprises:
a restriction member which is disposed on a side of the flat spring opposite to the card collection box and structured to interpose the feeding passage of the card therebetween for maintaining the crossing state of the flat spring over the second passage, wherein the restriction member contacts a portion of the flat spring crossing the second passage;
a card issuing part is disposed so as to superpose the card collection box in a vertical direction;
wherein the second passage comprises a card issuing part side and a card collection box side; and
wherein the restriction member is disposed on the card issuing part side.

2. The card collection mechanism according to claim 1, further comprising:
a pad roller which faces the feeding roller and which is urged to the feeding roller; and
a first passage where the card is passed from the feeding roller to the card collection box;
wherein the first passage is structured so the card is restored to a straight shape when a rear end of the card carried to the card collection box has passed through between the feeding roller and the pad roller.

3. The card collection mechanism according to claim 2, wherein the feeding roller is provided at a fixed position, and the pad roller is structured to be movable in an up and down direction relative to the pad roller and structured to be pressurized against the feeding roller.

4. The card collection mechanism according to claim 1, wherein
the feeding roller is structured to be capable of carrying the card both in a first carrying direction where the card is carried from the feeding roller to the card collection box and in a second carrying direction which is a direction opposite to the first carrying direction and where the card is carried from a card processing part performing a prescribed processing to the card to the feeding roller; and
the guide part guides the card to the card collection box when the card is carried in the first carrying direction and, when the card is carried in the second carrying direction, the guide part permits to carry the card from the card processing part to the feeding roller.

5. The card collection mechanism according to claim 1, wherein the card collection box and the feeding roller are disposed on both sides of the feeding passage of the card so as to interpose the feeding passage of the card.

6. The card collection mechanism according to claim 5, further comprising:
a first passage where the card passes from the feeding roller to the card collection box;
a second passage where the card passes from the card processing part to the feeding roller; and a flat spring which is provided in the guide part, at least a part of which is disposed in the first passage and the second passage.

7. The card collection mechanism according to claim 6, wherein
the flat spring forms the first passage and is disposed to cross the second passage, and
when the card is carried in the first carrying direction, the flat spring maintains a crossing state over the second passage, and
when the card is carried in the second carrying direction, the second passage is released by using elasticity of the flat spring.

8. The card collection mechanism according to claim 7, further comprising
a restriction member which is disposed on an opposite side of the card collection box so as to interpose the feeding passage of the card therebetween for maintaining the crossing state of the flat spring over the second passage.

9. A card issuing device comprising:
a card collection mechanism comprising:
a card collection box for collecting a card;
a feeding roller for carrying the card from a feeding passage to the card collection box, wherein the feeding passage is formed in a straight line manner; and
a guide part for guiding the card from the feeding passage to the card collection box;
wherein the guide part guides the card while the card is resiliently bent in a direction where an urging force directed to a surface of the feeding roller is applied to the card when the card is carried to the card collection box; and
wherein the feeding roller carries the card to a state in which the card is capable of being collected in the card collection box;
wherein the card collection mechanism further comprises:
a first passage where the card is passed from the feeding roller to the card collection box;
a second passage where the card is passed from the card processing part to the feeding roller; and
a flat spring which is provided in the guide part, at least a part of which is disposed in the first passage and the second passage;
wherein the flat spring forms the first passage and is disposed to cross the second passage;
wherein when the card is carried in the first carrying direction, the flat spring maintains a crossing state over the second passage;
when the card is carried in the second carrying direction, the card abuts the flat spring and resiliently bends the flat spring to open the second passage; and
wherein the card collection mechanism further comprises:
a restriction member which is disposed on a side of the flat spring opposite to the card collection box and structured to maintain the crossing state of the flat spring over the second passage, wherein the restriction member contacts a portion of the flat spring crossing the second passage; and
a card issuing part which comprises:
a card storage part in which cards are to be stored; and
a card sending mechanism for sending a stored card which is stored in the card storage part to the feeding roller;
wherein the card issuing part is disposed so as to superpose the card collection box in a vertical direction;
wherein the second passage comprises a card issuing part side and a card collection box side; and
wherein the restriction member is disposed on the card issuing part side.

10. The card issuing device according to claim 9, wherein
the feeding roller is structured to be capable of carrying the card both in a first carrying direction where the card is carried from the feeding roller to the card collection box and in a second carrying direction which is a direction opposite to the first carrying direction and where the card is carried from a card processing part performing a prescribed processing to the card to the feeding roller; and
the guide part is structured so that the guide part guides the card to the card collection box when the card is carried in the first carrying direction and, when the card is carried in the second carrying direction, the guide part permits to carry the card from the card processing part to the feeding roller, and
a card reader for performing reproduction of information recorded on a card and recording of information to a card is provided on the second carrying direction side of the card issuing part.

11. The card issuing device according to claim 9, further comprising:
a pad roller which faces the feeding roller and which is urged to the feeding roller;
wherein the feeding roller is provided at a fixed position, and the pad roller is structured to be movable in an up and down direction relative to the pad roller and structured to be pressurized against the feeding roller.

* * * * *